(12) United States Patent
Yabusaki et al.

(10) Patent No.: US 7,186,363 B2
(45) Date of Patent: Mar. 6, 2007

(54) LED INSERTING HOLDER INTEGRATED TYPE BASE BOARD AND MOLD THEREFOR

(75) Inventors: Kenichiro Yabusaki, Shizuoka (JP); Masatoshi Ishikawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 158 days.

(21) Appl. No.: 10/200,193

(22) Filed: Jul. 23, 2002

(65) Prior Publication Data
US 2003/0020192 A1    Jan. 30, 2003

(30) Foreign Application Priority Data
Jul. 24, 2001    (JP) ................. P.2001-222730

(51) Int. Cl.
*B29C 45/26*    (2006.01)
(52) U.S. Cl. ................. 264/219; 264/328.12; 425/190; 425/542; 249/102
(58) Field of Classification Search ............... 264/219, 264/85, 102, 328.12, 272.16; 425/190, 542, 425/546; 249/102
See application file for complete search history.

(56) References Cited

U.S. PATENT DOCUMENTS

| | | | | |
|---|---|---|---|---|
| 2,566,817 A | * | 9/1951 | Yellin | 249/60 |
| 3,484,901 A | * | 12/1969 | Anderson | 425/191 |
| 4,208,368 A | * | 6/1980 | Egli | 264/328.12 |
| 4,747,981 A | * | 5/1988 | Robinson | 264/1.9 |
| 5,059,373 A | * | 10/1991 | Hirabayashi | 264/154 |
| 5,112,207 A | * | 5/1992 | Pinsonneault | 425/192 R |
| 5,272,602 A | | 12/1993 | Sasajima et al. | |
| 5,289,353 A | | 2/1994 | Sasajima et al. | |

(Continued)

FOREIGN PATENT DOCUMENTS

GB    2339715    *    2/2000

(Continued)

OTHER PUBLICATIONS

Rosato et al, Injection Molding Handbook, second edition, 1995, ITP international Thomson Publishing, pp. 282-29.*

(Continued)

*Primary Examiner*—Jill L. Heitbrink
(74) *Attorney, Agent, or Firm*—Sughrue Mion, PLLC

(57) ABSTRACT

A holder integrated type base board made of synthetic resin integrally molded with a plurality of holders for inserting LEDs on a front face side of a base board main body and a mold therefore. The mold includes a first mold for molding a back face side of the base board main body and a second mold opposed to the first mold for molding the front face side of the base body main body. In addition, the mold includes a holder molding cavity provided at the second mold which is constituted by an insert die capable of being inserted into and detached from the second mold main body. When it is necessary to correct a position of a portion of the holder in a trially fabricated base board, a position of an LED inserting hole in the base board can simply be corrected by drawing the insert die for molding the holder from the mold main body and interchanging the insert die with a new insert die. As such, an entire first mold does not have to be reproduced.

18 Claims, 14 Drawing Sheets

U.S. PATENT DOCUMENTS

| | | | | |
|---|---|---|---|---|
| 5,387,096 A | * | 2/1995 | Wieser | 425/190 |
| 5,656,226 A | * | 8/1997 | McVicker | 264/318 |
| 5,656,227 A | * | 8/1997 | Foster | 264/328.1 |
| 5,746,497 A | | 5/1998 | Machida | |
| 5,882,699 A | * | 3/1999 | Takikawa et al. | 425/546 |
| 5,902,512 A | * | 5/1999 | Streit | 249/103 |
| 6,406,173 B1 | * | 6/2002 | Serizawa et al. | 362/545 |
| 6,746,634 B2 | * | 6/2004 | Shimakura | 425/190 |

FOREIGN PATENT DOCUMENTS

| | | | |
|---|---|---|---|
| JP | 61-077212 U | | 5/1986 |
| JP | 06-134767 A | | 5/1994 |
| JP | 7-246641 | * | 9/1995 |
| JP | 08-090603 A | | 4/1996 |
| JP | 2000-037736 A | | 2/2000 |
| JP | 2000-243110 A | | 9/2000 |

OTHER PUBLICATIONS

Rosato et al., Injection Molding Handbook, 2$^{nd}$ edition, 1995, International Thomason Publishing, pp. 23-25 and 606-614.*

* cited by examiner

LED INSERTING HOLDER INTEGRATED TYPE BASE BOARD AND MOLD THEREFOR

BACKGROUND OF THE INVENTION

1. Field of the Invention

The present invention relates to an LED (light emitting diode) arranging base board and a mold therefore. The LED arranging base board holds LEDs constituting a light source of, for example, a rear lamp of a tail & stop lamp, a turn signal lamp, or the like of an automobile. In particular, the present invention relates to an LED arranging base board and a mold therefore in which LED inserting holders are integrally molded with a base board main body.

2. Description of the Related Art

In the related art, there is known a lamp piece using LED for a light source as a marker lamp of an automobile. LEDs are attachedly inserted into a number of holders installed in parallel to a front face of a base board made of synthetic resin contained inside of a lamp chamber. The LEDs allow for illuminating the entire front face lens. According to the base board of the related art, as shown by FIGS. 16 and 17, a base board main body a is formed in a shape of a stepped three-dimensional curved face following a shape of a curved face of a front face lens e. An LED inserting holder c is attachedly inserted into a respective stepped portion b and integrated to the base board main body a. Further, LEDs d attachedly inserted into the respective holders c, are aligned on the curved face following the curved face shape of the front face lens e for making the entire front face lens e uniformly emit light.

According to the base board of the above-described related-art structure, the LED inserting holders c are formed separately from the base board main body a, therefore increasing the number of parts and making the inserting and fixing operations troublesome. Hence, as shown by FIG. 18, there has been proposed a holder integrated type base board for integrally molding the LED inserting holder c to the base board main body a.

The holder integrated type base board is molded by injection molding using molds having a first mold for molding a front face side (holder side) of the base board main body formed with a number of cavities for molding holders, and a second mold for molding a rear face side of the base board main body.

Further, when the holder integrated type base board constituting a molded product is actually integrated to a lamp piece, for example, owing to an error of integrating the base board or the front face lens, distances between portions of LEDs and the front face lens are not as designed. In the case of installing a reflector at a vicinity of each LED, for example, owing to an error of integrating the base board or the reflector, positions of portions of LEDs relative to the reflectors are not as designed and therefore, there is a concern that the front face lens does not uniformly emit light, a proper light distribution is not achieved, or the like and therefore, in such a case, at a stage of trial fabrication of the base board, it is necessary to correct a molding face of the mold such that the holder is disposed at a proper position.

However, it is difficult to correct only portions of a number of holder molding cavities formed at the molding face of the first mold for molding the front face side (holder side) of the base board main body and after all, a new first mold formed with a number of holder molding cavities is required to be fabricated. This poses a problem in that enormous labor is needed in addition to increased costs and time expended in fabrication of the holder.

Hence, the inventors have constituted an insert die structure in which holder molding cavities in correspondence with respective holders are insertible and detachable to and from a mold main body. In this configuration, an insert die that causes improper positioning of a holder can be interchanged by another new corrected insert die. Using the present invention in this configuration is very convenient and therefore, the inventors have proposed the invention.

SUMMARY OF THE INVENTION

The invention has been carried out in view of the above-described problem of the related-art technology and it is an object thereof to provide an LED inserting holder integrated type base board and mold therefore. The mold of the present invention is capable of simply dealing with a correction of a position of forming the holder.

In order to achieve the above-described object, according to a first aspect of the invention, there is provided a mold structure for molding a lamp inserting holder integrated type base board comprising:

a first mold for molding a rear face side of a main body of the base board; and a second mold opposed to the first mold for molding a front face side of the main body of the base board, the second mold including a holder molding cavity, the holder molding cavity at least partially defined by one or more removable insert dies.

(Operation) When the LED is attachedly inserted into the respective holder of the trially fabricated base board to integrate a lamp piece to light, in the case in which there is a necessity of correcting a holder position of the LED, the insert die for molding the holder is removed from the second mold main body and interchanged by a new insert die for molding the holder. As such, a position of an LED inserting hole can be corrected in the base board.

According to a second aspect of the invention, in the mold structure for molding an LED inserting holder integrated type base board according to the first aspect, the insert die includes an outer peripheral block in a cylindrical shape for molding an outer side of the LED inserting holder and an inner peripheral block arranged to be inserted to an inner side of the outer peripheral block for molding an inner side of the LED inserting holder including an LED inserting hole.

(Operation) By correcting the position of inserting the inner peripheral block in the outer peripheral block, that is, by interchanging the outer peripheral block with another outer peripheral block in which an engaging hole for inserting the inner peripheral block is shifted in a horizontal direction, the position of the LED inserting hole in the base board (holder position) can be corrected.

According to a third aspect of the invention, in the mold structure for molding an LED inserting holder integrated type base board according to the second aspect of the invention, an LED attachedly inserted into the holder is constructed by a press contact wiring structure in which a lead terminal of the LED breaks an insulating cover of an electric cord arranged at the LED inserting hole and is held by an electric cord core wire portion in a press contact state and a cord carrying portion having a thin thickness for carrying an electric cord relative to the inserted lead terminal of the LED is projected from the LED inserting hole of the holder. Further, in the third aspect, the inner peripheral block constituting the insert die is constituted by an outer side inner peripheral block engaging with the inner side of the outer peripheral block and an inner side inner peripheral block engaged with the inner side of the outer side inner peripheral block and a boundary between the outer side inner peripheral block and the inner side inner peripheral block is disposed at a portion opposed to a distal end portion of a cavity for molding the cord carrying portion.

Here, the lead terminal of the LED is folded back in a plate thickness direction at, for example, a middle portion in a length direction thereof, fitted to the LED inserting hole of the holder at two locations on a base end side and a front end side thereof and is brought into contact with the electric cord. That is, the lead terminal inserted into the LED inserting hole of the holder, breaks the insulating cover of the electric cord and is held by the core wire portion thereof in a press contact state.

(Operation) In a step of injecting molten resin to the cavity for molding the base board, the molten resin injected into the mold (base board molding cavity), flows into the cord carrying portion molding cavity and gases inside of the cord carrying portion molding cavity are pushed by the flowing molten resin and are drawn outside of the mold from the boundary between the outer side inner peripheral block and the inner side inner peripheral block. Accordingly, the molten resin is firmly filled up to the distal end portion of the cord carrying portion molding cavity.

According to the first through third aspects of the invention, a lamp assembly can be produced comprising:

a lamp inserting holder integrated type base board including a lamp inserting holder;

a lamp attachedly inserted into the lamp inserting holder, the lamp including a press contact terminal and a projection; and an electric cord connected to a power supply, the electric cord arranged at a portion of the lamp inserting holder;

wherein the press contact terminal, when inserted into the lamp inserting holder, is operable to break an insulating cover of the electric cord to form an electrical connection, and wherein the electrical connection is prevented from being interrupted by the projection biting a wall surface of the lamp inserting holder to prevent the lamp from withdrawing from the lamp inserting holder.

Further, using the molds of the present invention as described above, a method for molding a lamp inserting holder integrated type base board can be used comprising:

fastening a first and a second mold together to form a cavity, the first mold for molding a rear face side of a main body of the base board, and the second mold opposed to the first mold for molding a front face side of the main body of the base board, the second mold including a holder molding cavity, the holder molding cavity at least partially defined by one or more removable insert dies;

injecting a molding material from a gate into the cavity formed between the first mold and the second mold, the molding material also filling the holder molding cavity;

cooling and solidifying the molding material; and evaluating positions of molded lamp insertion holders, and if one or more of the positions are incorrect, removing and replacing at least a portion of the one or more removable insert dies responsible for the incorrect positions.

DETAILED DESCRIPTION OF THE PREFERRED EMBODIMENTS

An explanation will be given of a mold for carrying out the invention based on embodiments as follows.

FIG. 1 through FIG. 9 show an embodiment of a tail & stop lamp for an automobile containing a light source unit attachedly inserting and integrating LED to a base board produced by injection molding by using a mold according to the invention.

Figure 1:
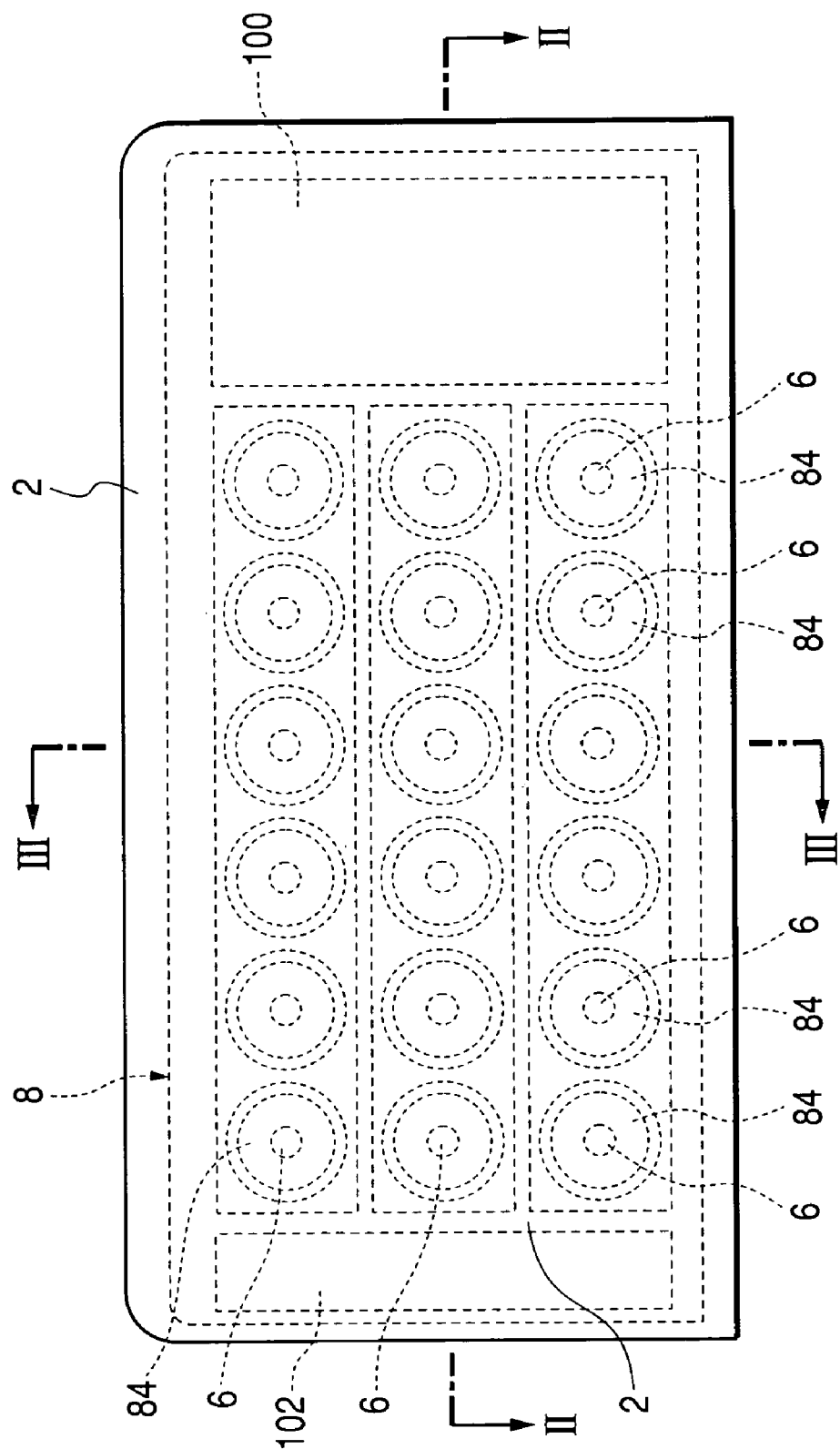
FIG. 1 is a front view of a tail & stop lamp for an automobile containing a light source unit integrally and attachedly inserted LED to a base board subjected to injection molding by using a mold according to the invention.
Figure 2:
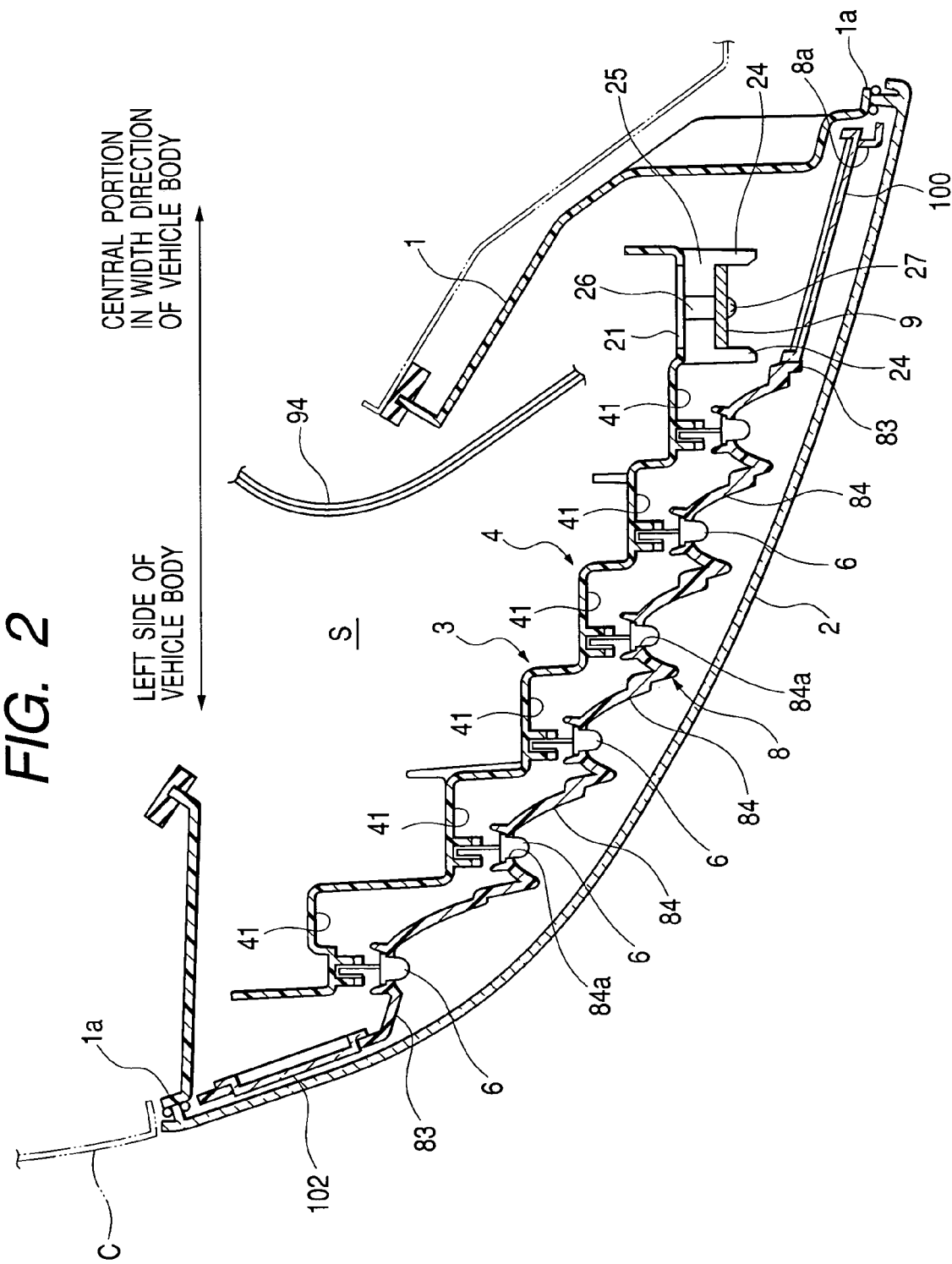
FIG. 2 is a horizontal sectional view (a sectional view taken along a line II—II shown in FIG. 1) of the lamp.

As shown by these drawings, particularly, FIGS. 1 and 2, the tail & stop lamp is attached to a left corner portion of a rear portion of an automobile and a total shape thereof is formed in a shape passing from a vicinity of a central portion in a width direction of a vehicle body over to a left side of the vehicle body. Therefore, an opening portion of a front base of a lamp body 1 made of synthetic resin in the shape of a vessel, is formed in a three-dimensional shape following a three-dimensional face of an outer plate C of the automobile (refer to FIG. 2). Further, the opening portion of the front face of the lamp body 1 is integrally assembled with a front face lens 2 formed in a three-dimensional shape following the three-dimensional face of the outer plate C of the automobile and a lamp chamber S (refer to FIGS. 2, 3) is partitioned by the lamp body 1 and the front face lens 2. The front face lens 2 is fixed to a peripheral edge portion 1a of the opening portion of the front face of the lamp body 1 by heat welding or the like at a peripheral edge portion thereof.

Figure 3:
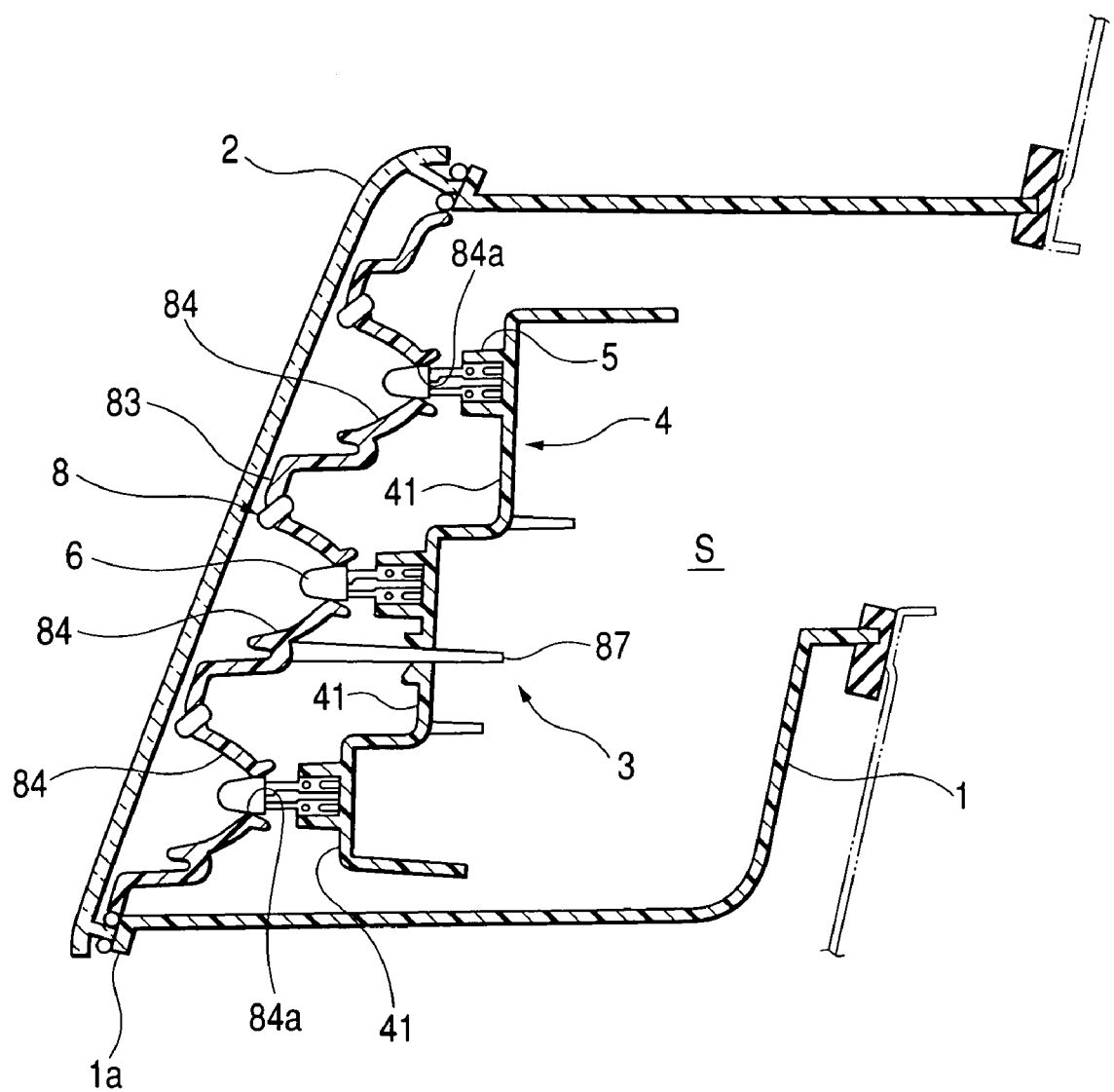
FIG. 3 is a vertical sectional view (a sectional view taken along a line III—III shown in FIG. 1) of the lamp.

Inside the lamp chamber S, as shown by FIGS. 2 and 3, there is contained a reflector 8 having a shape substantially along the front face lens 2 and an extension portion 83 of the reflector 8 is formed in a shape of a three-dimensional shape similar to that of the front face lens 2. Further, the reflector 8 is provided with a plurality of reflector portions 84 in a shape of a paraboloid of revolution opposed to respective LEDs 6 integrated to a base board 4, mentioned later.

The reflector 8 is integrally molded by resin molding using a resin of a material the same as that of the base board 4, and a front face side thereof is constituted as a reflecting face formed with an aluminum vapor deposited film or the like. Particularly, the reflecting face of the reflector portion 84 is constituted by a drawn reflecting face provided with very small recesses and projections to thereby diffuse and reflect light emittance of LED 6. The outer lens 2 is of light red color and light emittance of a red color of LED 6 becomes a deep red color by transmitting through the outer lens 2.

Further, the reflector 8 is contained completely on an inner side of the lamp body 1 and is fixed between the front face lens 2 and the lamp body 1 by welding the front face lens 2 to the lamp body 1.

Also, an opening portion 84a is provided at a rear face of the respective reflector portion 84 of the reflector 8 and inside of the opening portion 84a, there is arranged a resin mold 62 of LED 6 supported by the base board 4 to face the opening portion 84a. The resin mold 62 of LED 6 is held in a mode surrounded by the reflector 8 (reflector portion 84) (refer to FIG. 7).

Figure 4:
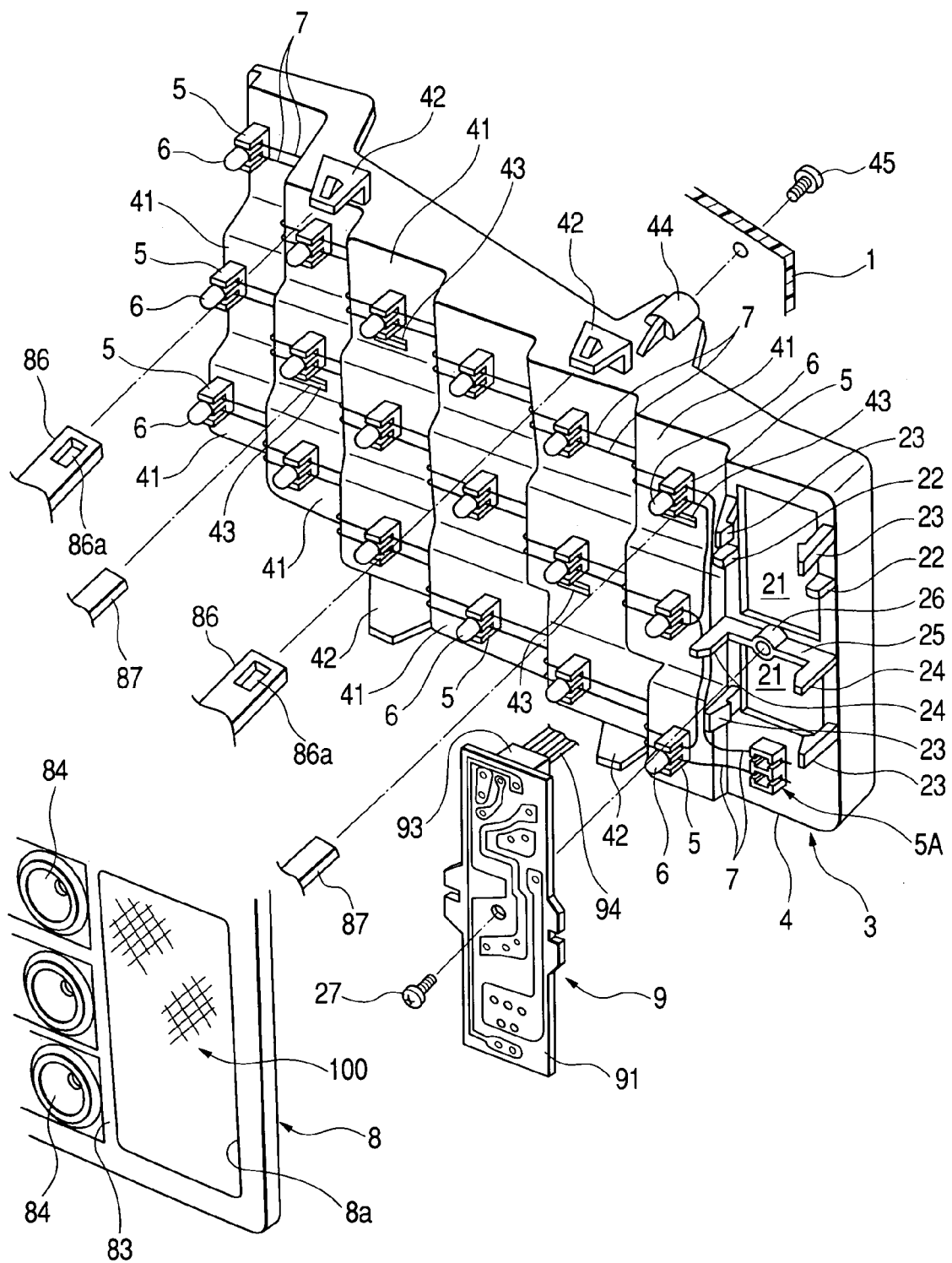
FIG. 4 is a disassembled perspective view of an essential portion of the lamp.

That is, as shown in FIG. 4, four pieces of locking hooks 42 formed to project on a front face side of the base board 4 are engaged with engaging holes 86 of extension pieces 86 formed to extend on a rear face side of the reflector 8. In addition, extension pieces 87 formed to extend on a rear face side of the reflector 8 are engaged to four pieces of engaging holes 43 provided on a front face side of the base board 4, respectively. Further, the resin molds 62 of LEDs 6 supported by the base board 4 are projected from the opening portion 84a of the reflector 8, and the peripheral edge portion of the base board 4 is brought into contact with the rear face side of the reflector 8. The reflector 8 and the base board 4 are positioned to each other in an up and down direction, in a left and right direction, and in a front and rear direction and are fixedly integrated without play.

Further, there is arranged a control circuit board 9 supported by the base board 4 at a rear vicinity of a right end portion of the reflector 8 integrated to the lamp body 1. At a position in correspondence with the control circuit board 9 of the reflector 8, there is provided a reflex reflector 100 constituted by a returning reflecting face for reflecting light incident from a rear side of the vehicle body via the front face lens 2 in an incident direction and therefore, the control circuit board 9 is prevented from being seen from a front side of the lamp.

At a vicinity of a left side end portion of the reflector 8, there is provided a side reflex reflector 102 constituted by a returning reflecting face for reflecting light from a side of the vehicle body incident via the front face lens 2 to an incident direction (refer to FIGS. 1, 2).

Next, an explanation will be given of details of a light source unit 3 comprising the base board 4, LED 6, an electric cord 7 and the control circuit board 9.

As shown by FIGS. 2, 3 and 4, the base board 4 is constituted by a plurality of stepped portions 41 arranged steppedly in three-dimensional directions and the respective stepped portions 41 are aligned substantially along the three-dimensional face shape of the front face 2 and are fixed to the lamp body 1. The respective stepped portions 41 are projected with holders 5 for attachedly inserting LEDs all having the same shape. LEDs 6 are held by the holders 5 and the electric cords 7 having insulating covers are extended over to the respective holders 5 and electricity is conducted to respective LEDs 6 by the electric cords 7. On the front face side of the right side edge portion of the base board 4, there is attached the control circuit board 9 constituting an electric circuit for controlling light emittance of LED 6 and the electric cords 7 extended to the respective holders 5 are electrically connected to the control circuit board 9.

The holders 5 are integrated to the base board 4 by integral molding of resin, the stepped portions 41 are formed in a stepped shape in the up and down direction and the left and right direction of the vehicle body and the respective stepped portions 41 and the respective holders 5 projected from the respective stepped portions 41 are integrally formed by resin molding to constitute a three-dimensional curved face substantially in parallel with the front face lens 2 when the respective stepped portions 41 and the respective holders 5 are enveloped. Further, the base board 4 is fixed to the lamp body 1 by a screw 45 at a boss portion 44 provided at one location of a peripheral portion thereof (refer to FIG. 4).

Figure 5:
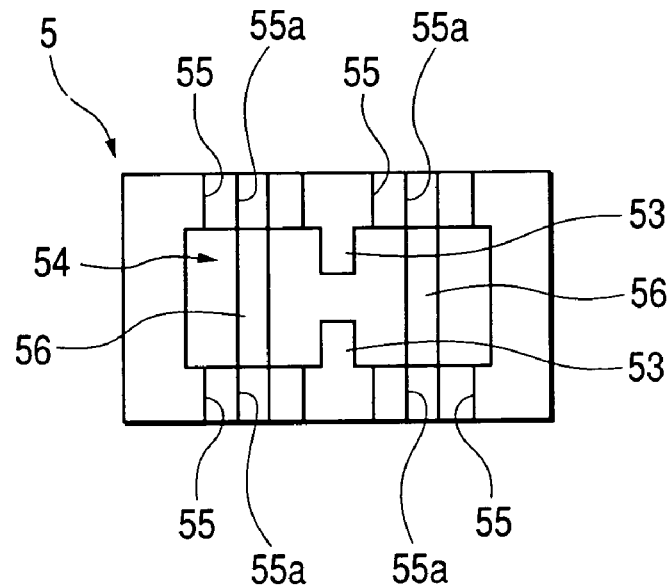
FIG. 5 is a plane view of a holder.
Figure 6:
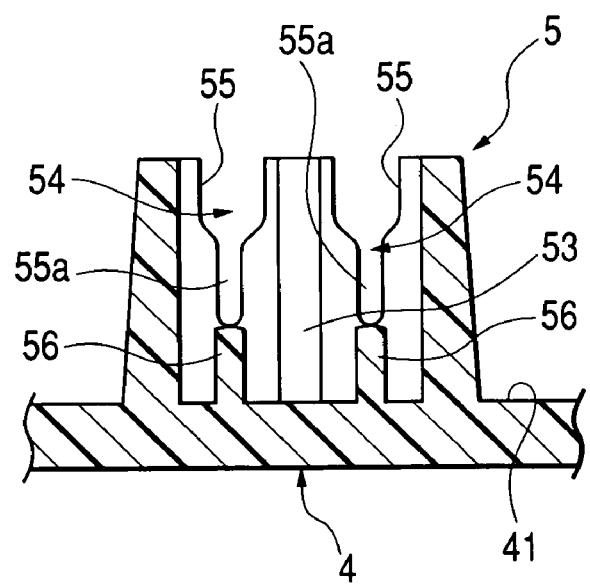
FIG. 6 is a vertical sectional view of a holder.
Figure 7:
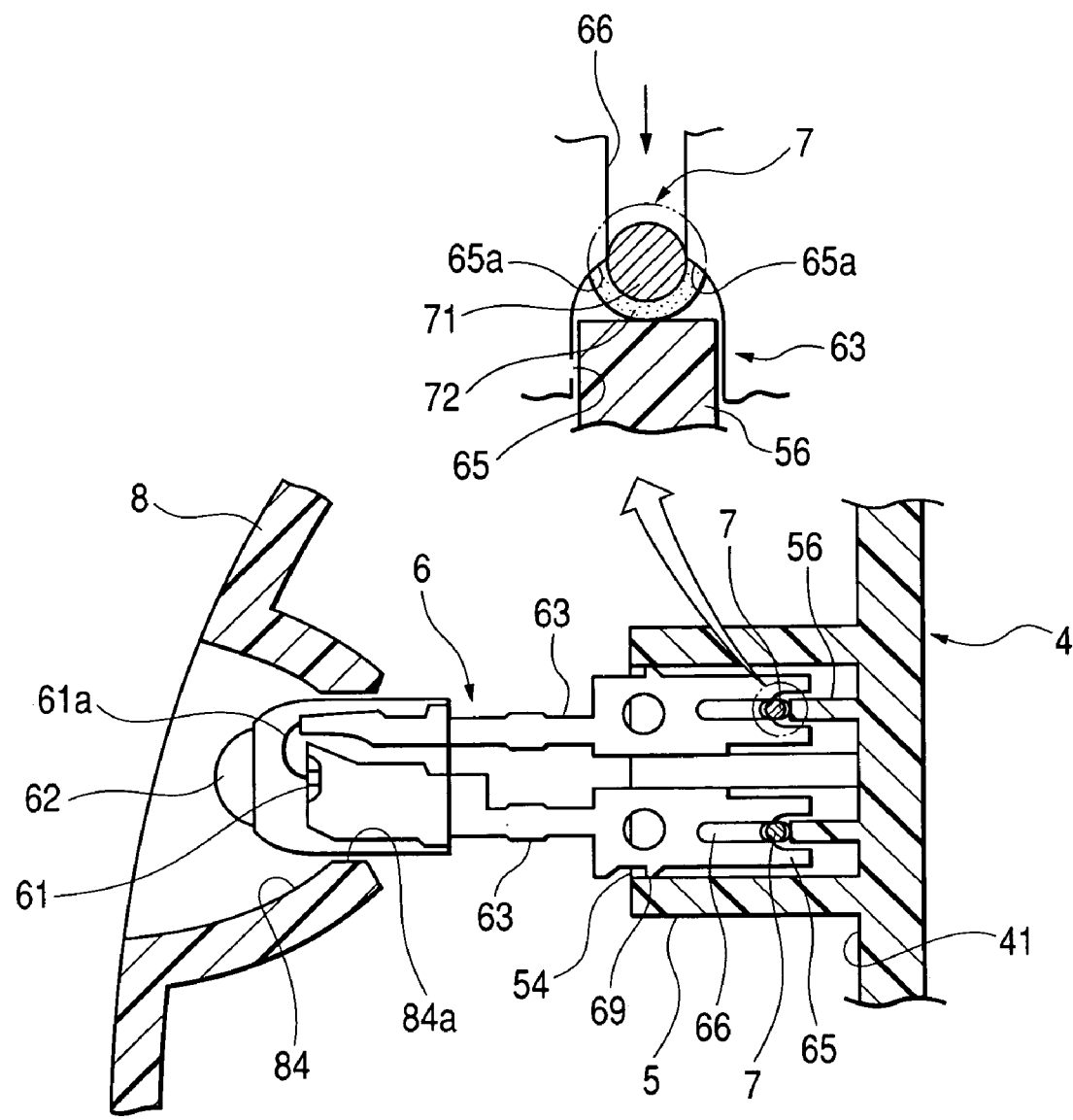
FIG. 7 is a vertical sectional view enlarging an essential portion of the lamp.
Figure 8:
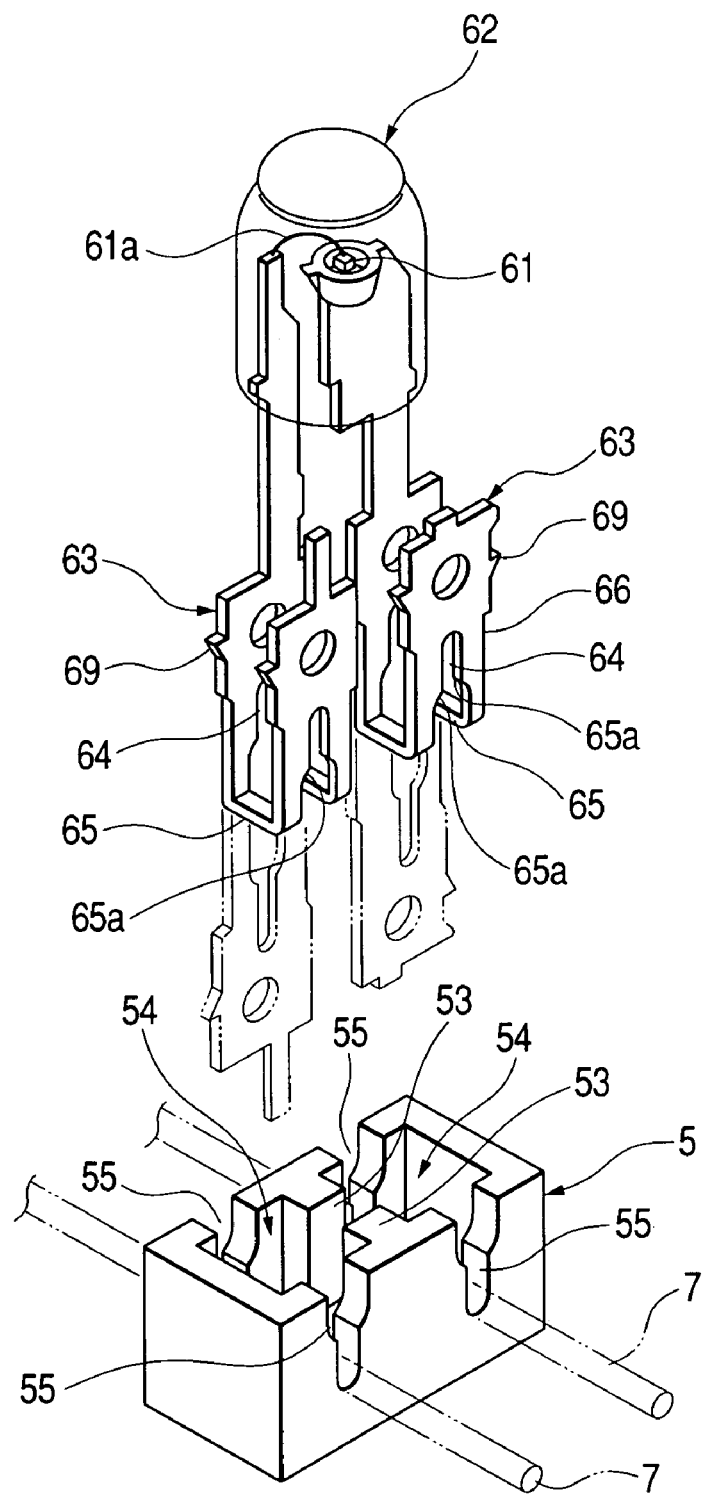
FIG. 8 is a disassembled perspective view of a holder and LED.

As shown to enlarge in FIGS. 5, 6 and 7, the holder 5 is formed in a shape of a rectangular container, a front face of which is opened and projected orthogonally to the front face of the stepped portion 41. The front face opening of the holder 5 is partitioned to two terminal insertion ports 54 aligned in a longitudinal direction by projected streaks 53 provided at middle positions in the longitudinal direction of inner faces of two side walls thereof. At the two side walls of the holder 5 in correspondence with the two terminal insertion ports 54, there are formed code insertion grooves 55 to notch from a front face side to a rear face side thereof. Although the code insertion grooves 55 are formed to be wide in width on the opening side, the code insertion grooves 55 are formed to be narrow in width on a front end side 55a and a width dimension of the groove front end side 55a is made to be substantially equal to a diameter dimension of the electric cord 7. At an inner bottom face of the terminal insertion port 54 at a front end position of the code insertion groove 55, there is erected a guide piece 56 constituting a cord carrying portion for carrying the electric cord 7 arranged inside of the lead insertion port 54 for engaging with a front end of a lead terminal 63 of LED 6.

LED 6 is constituted as a discrete type LED and includes an LED element chip 61 sealed by a rein mold 62. A pair of the parallel lead terminals 63 electrically connected to the LED element chip 61 are projected from the resin mold 62 as shown to enlarge in FIG. 8. Notation 61a indicates a bonding wire for connecting the LED element chip 61 and the lead terminals 63 opposed thereto. The lead terminal 63 is formed by individually cutting and bending a lead frame produced by pressing or etching a metal plate. Before bending, as shown by imaginary lines in FIG. 8, the lead terminal 63 is formed in a shape of a slender strip having a slit 64 at a central area thereof. Here, a width dimension of the lead terminal 63 is formed to be a dimension more or less smaller than a width dimension of the terminal insertion port 54 of the holder 5.

Meanwhile, the slit 64 is constituted by a wide slit portion 65 at a middle portion in a length direction thereof and narrow slit portions 66 at both ends thereof. The wide slit portion 65 is formed in an oval shape and a boundary portion 65a constituting a boundary with the narrow slit portion 66 is formed in a circular arc shape. Further, a width dimension of the wide slit portion 65 is formed to be a dimension more or less larger than a diameter dimension of the electric cord 7, and a width dimension of the narrow slit portion 66 is formed by a dimension substantially equal to a diameter dimension of a core wire inside the insulating cover. As shown by FIG. 7, the lead wire 63 is folded back substantially in a channel-like shape in a plate thickness direction at substantially a middle position in the length direction. That is, at a middle position of the wide slit portion 65, thereby, the lead terminal 63 is formed as a lead in a bifurcated shape constituting a front thereof by the middle position of the wide slit portion 65 and a double blade shape having a width equal to the width dimension of the terminal insertion port 54 of the holder 5.

Further, a side edge of the lead terminal 63 is formed with a very small projection 69 for preventing detachment. When the lead terminal 63 is inserted into the holder 5, the very small projection 69 bites a wall face thereof to prevent the lead terminal 63 from being detached.

When the light source unit 3 is integrated by the base board 4, LED 6, and the electric cord 7 having the above-described constitution, firstly, two pieces of the electric cords 7 are arranged in parallel over to the respective holders 5 of the base board 7. As shown to enlarge in FIG. 7, the electric cord 7 is an insulation covered electric wire cord in which a core wire 71 is covered by an insulating member and inserted into the front end side 55*a* of the code insertion groove 55 respectively provided at each of the pair of terminal insertion ports 54. Thereafter, the pair of lead terminals 63 of LED 6 are inserted into the respective terminal insertion ports 54 relative to the electric cords 7. The electric cords 7 at the code insertion groove 55 are brought into a state of being carried from a lower side by the guide piece 56 extended from a bottom portion of the groove front end side 55*a* and therefore, the inserted lead terminal 63 is advanced such that the wide slit portion 65 sandwiches an insulating cover 72 in the diameter direction and successively advanced while breaking the insulating cover 72 by the narrow slit portion 66. In this case, the boundary portion 65*a* between the wide slit portion 65 and the narrow slit portion 66, is constituted by an edge shape near to a right angle and therefore, an effect of breaking the insulating cover is promoted. Further, when the narrow slit portion 66 is inserted up to a position of sandwiching the electric cord 7, the narrow slit portion 66 and the core wire 71 of the electric cord 7 are brought into direct contact with each other and the lead terminal 63 and the electric cord 7 are electrically connected. Since the small projection 69 provided at the side edge of the lead terminal 63 bites the wall face, the lead terminal 63 is strongly held in a mode of being brought into press contact with the core wire 71 at a position of being inserted into the terminal insertion port 54.

As described above, the lead terminal 63 is constituted by the double blade shape by folding and therefore, at respective piece portions, the lead terminal 63 is brought into contact with inner faces of the terminal insertion port 54. As a result, LED 6 becomes difficult to be inclined.

Further, the lead terminal 63 is electrically connected to the electric cord 7 at two locations at respective piece portions and therefore, the connection can be ensured, which is also advantageous in view of reducing contact resistance therebetween.

Figure 9:
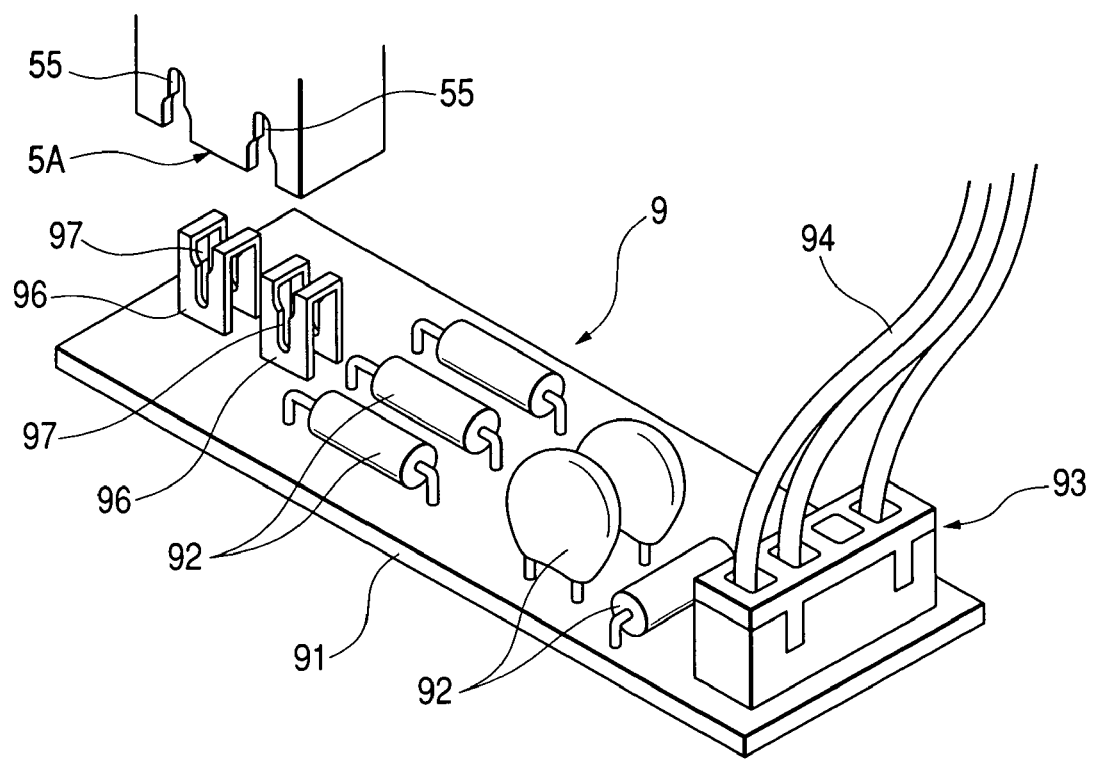
FIG. 9 is a perspective view of a control circuit board.

Meanwhile, one end of the electric cord 7 is electrically connected to the control circuit board 9 attached to the base board 4 (refer to FIG. 4). According to the control circuit board 9, as shown by FIG. 9, various electronic parts 92 are mounted on a printed circuit board 91 and a portion thereof is connected with a power source cord 94 connected to a battery outside of the drawing via a connector 93. In order to electrically connect the printed circuit board 91 and the electric cord 7, at a portion of a rear face (side of mounting the electric part 92) of the printed circuit board 91, there are erected a pair of pole terminals 96 having a shape the same as that of the lead terminal 63 of LED 6. According to the pole terminal 96, only the lead terminal 63 of LED 6 is similarly bent and thereafter, both end portions thereof are attached to the printed circuit board 91. Therefore, the pole terminal 96 is formed with a slit 97 similar to the slit 64 comprising the wide slit portion 65 and the narrow slit portion 66 of the lead terminal 63.

On a front end side of a vicinity of a right side end portion of the base board 4, a holder 5A having a structure the same as that of the holder 5 is formed to project. In order to connect the electric cord 7 to the pole terminal 96 on the side of the control circuit board 9, first, the base board 4 is directed to an upper side such that the front end side is directed to the upper side and the electric cord 7 is inserted into the code insertion groove 55 of the holder 5A opened to the upper side. Successively, the pole terminal 96 is fitted into the holder 5A by directing a side of the control circuit board 9 mounted with the electric parts 92, that is, by making the mode shown in FIG. 8 upside down. Thereby, according to the electric cord 7 inside of the holder 5A, by the slit 97 of the pole terminal 96, similar to the case of LED 6, the insulating cover of the electric cord 7 is broken and the electric cord 7 and the electrode terminal 96 can be connected to each other electrically.

At a vicinity of the right side edge portion of the base board 4, as shown by FIG. 4, there is formed an opening portion 21 in correspondence with the control circuit board 9, in other words, the vicinity of the right side end portion of the base board 4 is formed in a frame-like shape formed with the opening portion 21 in correspondence with the control circuit board 9. Further, at a peripheral edge portion of the opening portion 21, there are projected a pair of left and right ribs 22 for carrying the control circuit board 9 in cooperation with the holder 5A, two pairs of locking claws 23 for positioning the control circuit board 9 in the left and right direction and preventing the control circuit board 9 from being detached, and locking ribs 24 for positioning the control circuit board 9 by being engaged with notches on the side of the control circuit board 9. Also, at a position of crossing substantially a central portion in the up and down direction of the opening portion 21 in the left and right direction, there is projected a horizontal rib 25 for carrying the control circuit board 9.

When the control circuit board 9 is pushed against urge force of the ribs 23 and 24 and the pole terminal 96 is inserted into the holder 5A, the control circuit board 9 is brought into a mode of being positioned in the up and down direction and the left and right direction and carried by the ribs 22 and 25 and the holder 5A. Then, by fixing the control circuit board 9 to the base board 4 by arranging a screw 27 to a boss 26 erected at the horizontal rib 25, the control board circuit 9 is held in a mode of being separated from the front face of the base board.

When applied to a tail & stop lamp, for example, power from the power source cord 94 electrically connected to a battery outside of the drawing is supplied to the control circuit board 9, and further, supplied to the pair of electric cords 7 electrically connected to the pole terminal 96. The electric cords 7 are extended into the holders 5 erected at the plurality of stepped portions 41 of the base board 4, and electrically connected to the lead terminals LEDs 6 inside of the holders 5 to thereby make the respective LEDs 6 emit light. Emitted light of LED 6 is focused by the reflector portion 84 of the reflector 8 and is emitted to the front side of the lamp via the lens 2.

As a procedure of integrating the lamp, first, the power source unit 3 is integrally assembled to the reflector 8. An assembled body of the reflector and the light source unit is contained in the lamp body 1, the front face lens 2 is integrally welded to the lamp body 1 and thereafter, a rear face wall of the lamp body 1 and the base board 4 of the light source unit 3 are fixed by the screw 45 from the rear face side of the lamp body 1. Either of welding the front face lens 2 to the lamp body 1 and fixing the rear face wall of the lamp body and the base board 4, may be carried out prior to other thereof.

In this way, according to the embodiment, by forming the plurality of three-dimensionally arranged stepped portions 41, by forming the base board 4 in the stepped shape, and attachedly inserting LEDs 6 respectively to the holders 5 formed at the respective stepped portions 41, the three-dimensional arrangement of LEDs 6 is realized. Therefore, it is not necessary to arrange three-dimensionally and integrate the plurality of boards as in the related art example. This results in a reduction in the number of parts constituting the light source unit 3, allowing a low cost formation to be realized as well as simplifying the integrating operation.

Meanwhile, in integrating the light source unit 3, by inserting the electric cord 7 into the cord insertion hole 55 of the holder 5 and thereafter inserting the lead terminal 63 of LED 6 into the terminal insertion port 54 of the holder 5, by fitting the lead terminal 63 and the terminal insertion port 54, both of holding LED 6 and electrically connecting LED 6 and the electric cord 7 can simultaneously be carried out and integration becomes simple.

Further, at this occasion, at the boundary portion (edge) 65a of the wide slit portion 65 and the narrow slit portion 66 provided at the lead terminal 63, by preferably breaking the insulating cover 72 of the electric cord 7, the lead terminal 63 and the core wire 71 of the electric cord 7 are excellently connected electrically. In addition, the lead terminal 63 of LED 6 is constructed by the double blade constitution by bending. Therefore, when the lead terminal 63 and the electric cord 7 are brought into contact with each other at two locations, electric connection can preferably be carried out, and the dimension of the lead terminal 63 in the plate thickness direction can be increased. Also, LED 6 is prevented from being inclined inside of the holder 5 and stability of LED 6 in an optical axis direction and electric connection performance thereof to the electric cord 7 can respectively be promoted.

The reflector 8 integrally attached to the base board 4 is formed by a material the same as that of the base board 4 and therefore, even when the base board 4 and the reflector 8 are heated by light emitting of LED 6, the base board 4 and the reflector 8 are equally expanded thermally and therefore, a position of the reflector 8 relative to the base board 4 is not changed and a positional shift of the optical axis position of LED 6 in the reflector portion 83 can be prevented.

Figure 10:
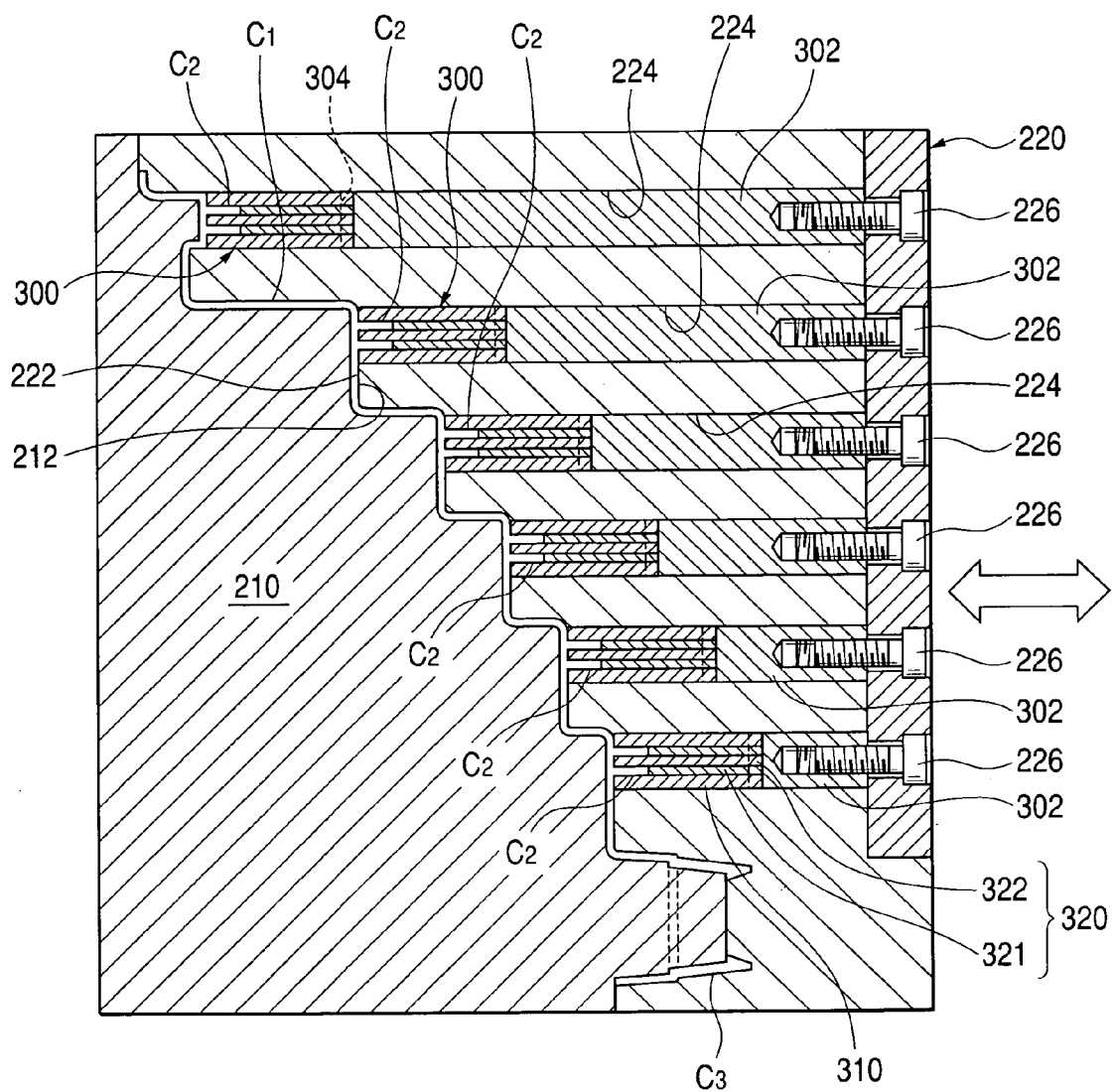
FIG. 10 is a sectional view of a first embodiment of a mold for molding a base board according to the invention.
Figure 13:
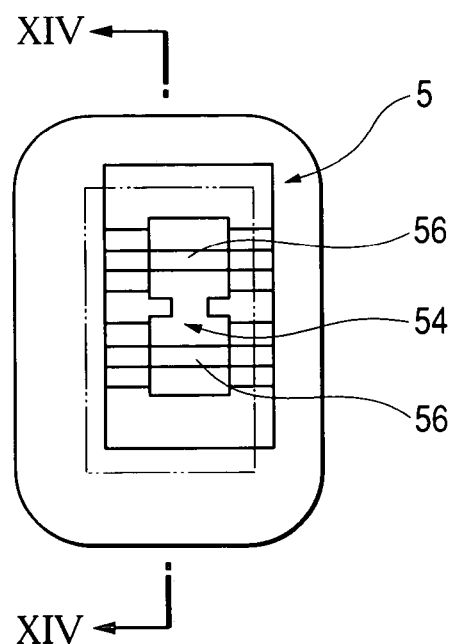
FIG. 13 is a plane view showing a case of shifting a position of a holder by a predetermined amount in parallel.
Figure 14:
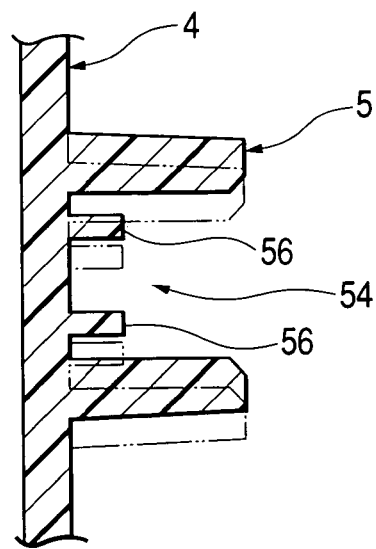
FIG. 14 is a sectional view (a sectional view taken along a line XIV—XIV shown in FIG. 13) showing a case of shifting a position of a holder by a predetermined amount in parallel.

An explanation will be given of an embodiment of a mode for subjecting the base board 4 to injection molding in reference to FIG. 10 through FIG. 14 as follows. FIG. 10 is a sectional view of a first embodiment of a mold for molding the base board according to the invention, FIG. 11 is an enlarged sectional view of a periphery of a cavity for molding a holder, FIG. 12 is a sectional view of an insert die for constituting the cavity for molding the holder (sectional view taken along a line XII—XII shown in FIG. 11), FIG. 13 is a plane view showing a case of shifting a position of the holder by a predetermined amount in parallel and FIG. 14 is a sectional view showing the case of shifting the position of the holder by the predetermined amount in parallel (sectional view taken along a line XIV—XIV shown in FIG. 13).

As shown by FIG. 10, the mold is constituted by a mold 210 on a fixed side for molding the rear face side of the base board and a section mold 210 on a movable side opposed to the first mold 210 for molding the front face side of the base board. The second mold 220 can be moved relative to the first mold 210 in an approaching and separating direction (arrow mark direction of FIG. 10).

Between molding faces 212 and 222 of the first mold 210 and the second mold 220 opposed to each other, there is formed a cavity C1 for molding the base board. At the molding face 222 of the second mold 220, there are formed cavities C2 for molding a number of the holders 5 formed on the front face side of the base board, cavities for molding the locking hooks 42 (not illustrated), and cavities C3 for molding the ribs 22, 23, 24 and 25 for supporting the control circuit board 9, respectively communicated to the cavity C1. Further, the base board 4 is molded by fastening the first mold 210 and the second mold 220, injecting molten resin from a gate (not illustrated) provided at the first mold 210 into the cavity C1 for molding the base board between the molds 210 and 220 and cooling and solidifying the molten resin filled in the cavity.

Figure 11:
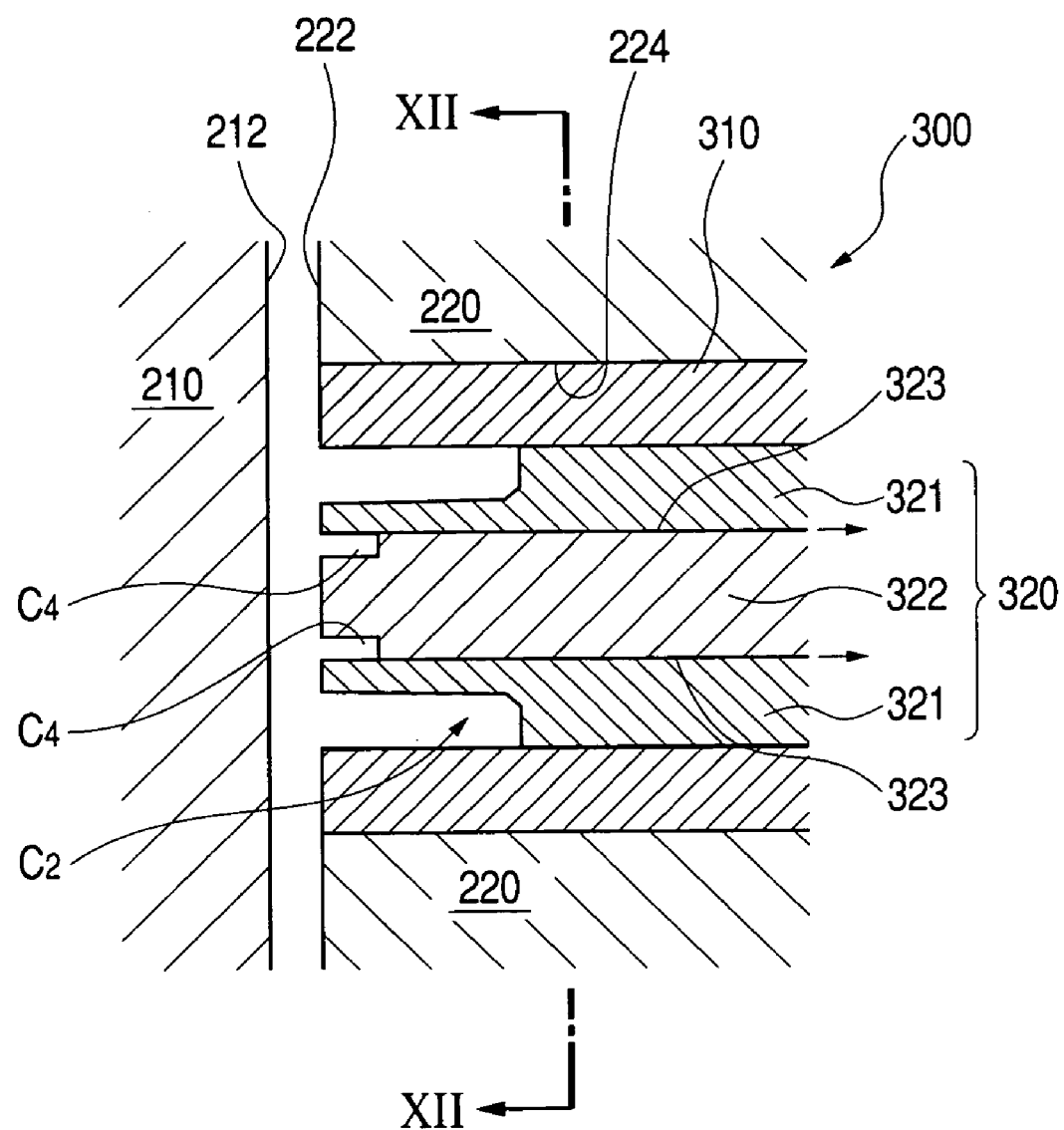
FIG. 11 is a sectional view enlarging a periphery of a cavity for molding a holder.
Figure 12:
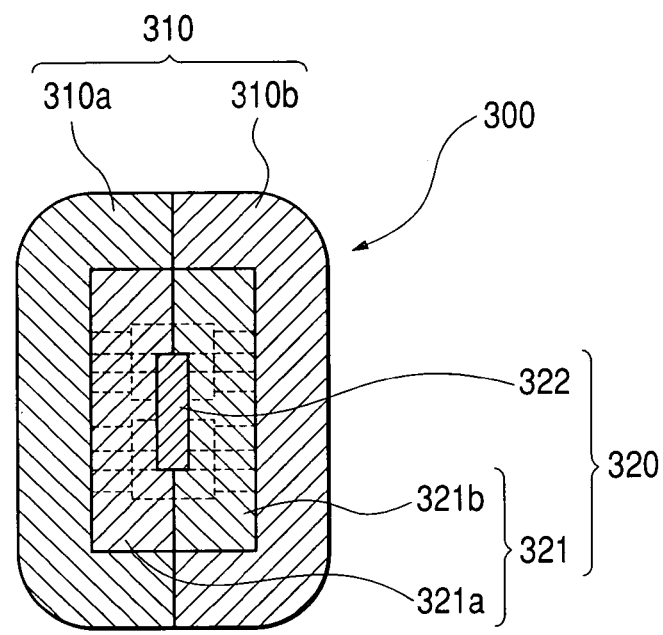
FIG. 12 is a sectional view (a sectional view taken along a line XII—XII shown in FIG. 11) of an insert die constituting a cavity for molding a holder.

As shown by FIGS. 11 and 12, the cavity C2 for molding the respective holder 5, is constituted by an insert die 300 having an outer peripheral block 310 in a cylindrical shape for molding an outer side of the holder 5 and an inner peripheral block 320 insertedly arranged on an inner side of the outer peripheral block 310 for molding an inner side of the holder 5 including the terminal insertion port 54. The insert die 300 (outer peripheral block 310 and the inner peripheral block 320) is constituted to be capable of being integrated to a guide bar 302 by sliding to engage with a front end portion of the guide bar 302 from a side. Notation 304 designates a slidingly engaging portion between the insert die 300 and the guide bar 302. Further, the insert die 300 inserted into an insert die insertion hole 224 from a side of the molding face 212 of the second mold 220, is fixed to the mold 220 by a bolt 226. In a case in which positions of portions of the holders 5 in the trially fabricated base board 4 are required to be corrected, all that is essentially required is to interchange the insert die 300 with a proper one thereof.

That is, there is a case in which when LEDs 6 are attachedly inserted and wired to the respective holders 5 of the trially fabricated base board 4 and integrated to constitute the lamp and the lamp is lighted. Sometimes, due to an error of integrating the base board 4, the front base lens 2, or the reflector 8, distances between portions of LEDs 6 and the front face lens 2 or the reflector 8 (reflector portion 84) are not as designed, and the front face lens 2 does not uniformly emit light or a proper light distribution is not achieved. Although in such a case it is necessary to correct positions of the improper holders in the molding face 222 of the second mold 220 such that the LEDs 6 (arrangement of the holders 5) are placed in proper positions, by drawing out the insert dies 300 for molding the holders from the mold main body 220 (insert die insertion holes 224) that need to be corrected and interchanging the insert dies 300 with new ones thereof in which the positions of the terminal insertion ports 54 are corrected, the positions of forming the holder 5 (positions of LED insertion holes) in the base board 4 can be corrected.

Particularly, by interchanging the outer peripheral block 310 of the insert die 300 with a new outer peripheral block 310, shifting of the position of the inner peripheral block engaging hole on the inner side of the outer peripheral block in the horizontal direction can occur such that the terminal insertion port 54 is disposed at the proper position, without interchanging the inner peripheral block 320, and the position of forming the holder 5 (position of LED insertion hole) in the base board 4 can be corrected from, for example, a position of an imaginary line shown in FIGS. 13 and 14 to a position indicated by a bold line.

Further, the inner peripheral block 320 is constituted by an outer side inner peripheral block 321 in a cylindrical shape engaged with the inner side of the outer peripheral block 310 and an inner side inner peripheral block 322 engaged with an inner side of the outer side inner peripheral block 321. Using this configuration, as explained below, allows for having a sufficient wall portion at a front end portion of the guide piece 56 having a thin thickness when a boundary 323 (refer to FIG. 11) between the outer side inner peripheral block 321 and the inner side inner peripheral block 322, is disposed at a position opposed to a distal end portion of a cavity C4 for molding the guide piece 56 constituting the cord carrying portion.

Figure 15:
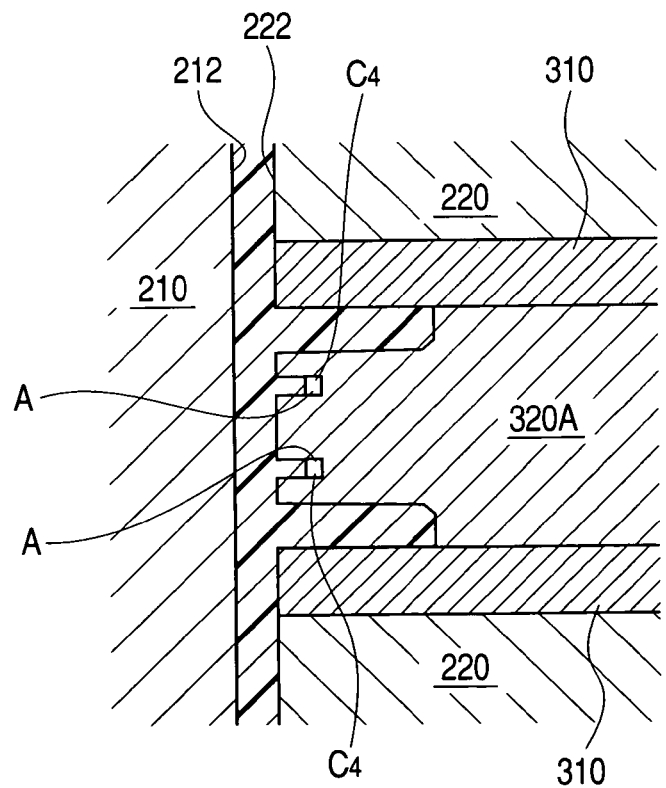
FIG. 15 is a sectional view showing a behavior of producing a deficient wall portion at a front end portion of a guide piece.
Figure 16:
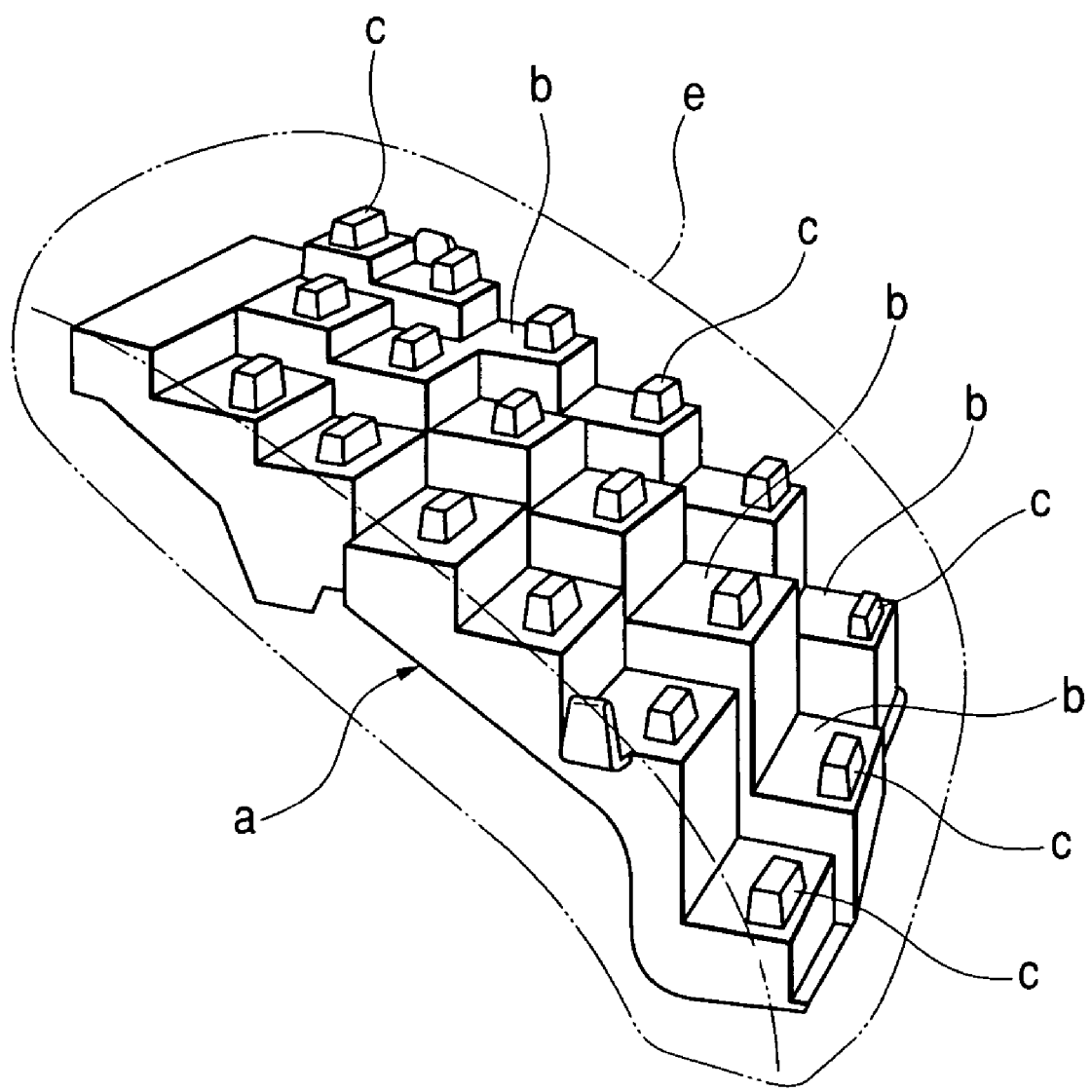
FIG. 16 is a perspective view of a related-art base board.
Figure 17:
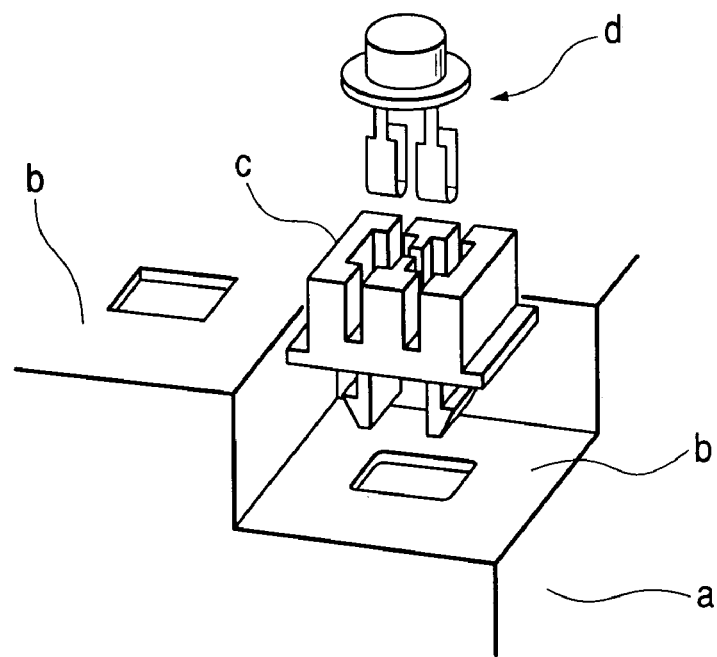
FIG. 17 is a perspective view showing a behavior of attachedly inserting a holder into a base board main body.
Figure 18:
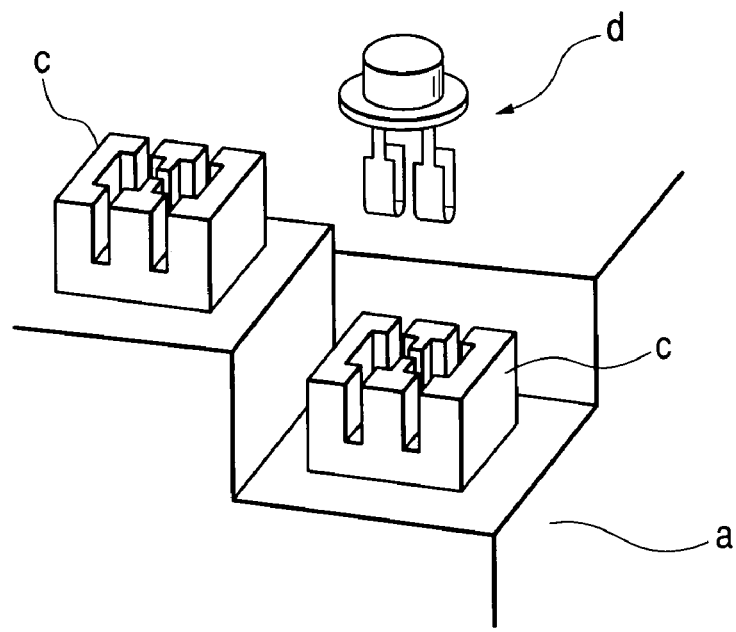
FIG. 18 is a perspective view of an essential portion of a holder integrated type base board.

More specifically, the guide piece 56 erected at the bottom face of the terminal insertion port 54 of the holder 5 is formed in a thin thickness substantially equal to a thickness of the electric cord 7 and therefore, as shown by FIG. 15, when the cavity C4 for molding the guide piece 56 is formed by a single piece of an inner peripheral block 320A, there is a concern that the molten resin is not filled up to the distal end portion of the cavity C4 having the thin thickness and cooled and solidified while leaving air at the distal end portion of the cavity C4 to thereby bring about the deficient wall portion at the front end portion of the guide piece 56. However, according to the embodiment, a gas inside of the cavity C4 is pushed by the molten resin flowing into the cavity C4 and as shown by arrow marks of FIG. 11, the gas is drawn from the boundary 323 between the outer side inner peripheral block 321 and the inner side inner peripheral block 322 to outside of the mold 200 and therefore, the molten resin is firmly filled up to the distal end portion of the cavity C4 and the deficient wall portion is not brought about at the guide piece 56 having the thin thickness.

As shown by FIG. 12, the outer peripheral block 310 and the inner peripheral block 320 (the outer side inner peripheral block 321) are respectively constructed by structures divided in two in the vertical direction. By integrating divided pieces 321*a* and 321*b* of the outer side inner peripheral block respectively to the outer side face of the inner side inner peripheral block 322, the divided pieces 321*c* and 321*b* can be integrated to constitute the inner peripheral block 320, and by integrating divided pieces 310*a* and 310*b* of the outer peripheral block respectively to the outer side face of the inner peripheral block 320, the divided pieces 310*a* and 310*b* can be integrated to constitute the insert die 300. Therefore, integration of the insert die 300 is facilitated.

Further, although according to the above-described embodiment, the insert die 300 is constituted by the outer peripheral block 310 and the inner peripheral block 320 (outer side inner peripheral block 321, inner side inner peripheral block 322), the inner peripheral block 320 may be constituted by an integrated body which is not divided into the outer side inner peripheral block 321 and the inner side inner peripheral block 322 and the insert die 300 may be constituted by an integrated body which is not divided into the outer peripheral block 310 and the inner peripheral block 320.

As has been explained above, according to the mold structure for molding the holder integrated type base board according to a first aspect of the invention, when the position of arranging a portion of the LED (holder position) in a trially fabricated base board is required to be corrected, the situation can be dealt with by interchanging a new insert die for molding the portion of the holder without interchanging the entire second mold, and therefore, cost and labor are reduced.

According to the second aspect of the invention, when the position of arranging a portion of the LED (holder position) in a trially fabricated base board is required to be corrected, the situation can be dealt with by interchanging only the outer peripheral block constituting a portion of the insert die and therefore, cost and labor are further reduced.

According to the third aspect of the invention, gases inside of the cord carrying portion molding cavity are pushed by molten resin flowing into the cord carrying portion molding cavity and drawn outside of the mold from the boundary between the outer side inner peripheral block and the inner side inner peripheral block and therefore, the molten resin is firmly filled up to a distal end portion of the cord carrying portion molding cavity. As such, there is provided the mold structure which has a sufficient size wall in the cord carrying portion having a thin thickness.

What is claimed is:

1. A method for molding a lamp inserting holder integrated type base board comprising:
    fastening a first and a second mold together to form a cavity, the first mold for molding a rear face side of a main body of the base board, and the second mold opposed to the first mold for molding a front face side of the main body of the base board, the second mold including a holder molding cavity, the holder molding cavity at least partially defined by one or more removable insert dies, wherein the insert dies comprise: an outer peripheral block for molding an outer side of a lamp inserting holder; and an inner peripheral block arranged to be inserted to an inner side of the outer peripheral block for molding an inner side of the lamp inserting holder including a lamp inserting hole;
    injecting a molding material from a gate into the cavity formed between the first mold and the second mold, the molding material also filling the holder molding cavity;
    cooling and solidifying the molding material; and
    evaluating positions of molded lamp insertion holders, and when one or more of the positions are incorrect, removing and replacing at least a portion of the one or more removable insert dies responsible for the incorrect positions.

2. The method for molding a lamp inserting holder integrated type base board according to claim 1, further comprising filling portions of the cavity with a gas before the injecting process, the gas operable to be expelled from the cavity during the injection process to ensure that each portion of the cavity is properly filled with the molding material.

3. The method according to claim 1, wherein the removable insert dies in each cavity are supported, on a side opposite the base board, by the second mold.

4. The method according to claim 3, further comprising, for each cavity, a guide bar having a first end fixed to the second mold by a bolt, and a second end supporting the removable insert dies.

5. The method for molding a lamp inserting holder integrated type base board according to claim 1, wherein:
the holder molding cavity is formed as a concave portion in a surface of the second mold;
the insert dies in the holder molding cavity are in contact with each other and are supported by an end surface of a single guide bar fixed to the second mold; and
the removing and replacing at least a portion of the removable insert dies comprises removing a first insert die, of the insert dies, having a first shape, and replacing the first insert die with another first insert die having a second shape, so that a second insert die, of the insert dies, is repositioned in the holder molding cavity.

6. A mold structure for molding a lamp inserting holder integrated type base board comprising:
a first mold for molding a rear face side of a main body of the base board; and
a second mold opposed to the first mold for molding a front face side of the main body of the base board,
wherein the second mold includes holder molding cavities, and each holder molding cavity is at least partially defined by removable insert dies,
wherein the insert dies in each cavity are supported, on a side opposite the base board, by the second mold,
wherein the insert dies comprise: an outer peripheral block for molding an outer side of a lamp inserting holder; and an inner peripheral block arranged to be inserted to an inner side of the outer peripheral block for molding an inner side of the lamp inserting holder including a lamp inserting hole,
wherein each of the holder molding cavities are formed as concave portions in a surface of the second mold, and
wherein the insert dies in each of the holder molding cavities are in contact with each other and are supported by an end surface of a single guide bar fixed to the second mold.

7. The mold structure for molding a lamp inserting holder integrated type base board according to claim 6, wherein the second mold further includes, in addition to the holder molding cavities, one or more secondary cavities also defined by the removable insert dies.

8. The mold structure for molding a lamp inserting holder integrated type base board according to claim 7, wherein the one or more secondary cavities form electrical interface portions of the base board.

9. The mold structure for molding a lamp inserting holder integrated type base board according to claim 6, wherein the outer peripheral block has a cylindrical shape.

10. The mold structure for molding a lamp inserting holder integrated type base board according to claim 6, wherein:
the inner peripheral block comprises an outer side inner peripheral block engaging with an inner side of the outer peripheral block and an inner side inner peripheral block engaged with an inner side of the outer side inner peripheral block; and
a boundary between the outer side inner peripheral block and the inner side inner peripheral block is disposed at a portion opposed to a distal end portion of a cavity for molding a cord carrying portion of the base board.

11. The mold structure for molding a lamp inserting holder integrated type base board according to claim 10, wherein the boundary is adapted to allow passage of gas from between the first and second molds.

12. The mold structure for molding a lamp inserting holder integrated type base board according to claim 6, wherein:
the outer peripheral block defines a radially outer wall of the holder;
the inner peripheral block is formed in a two-piece construction, and defines a radially inner wall of the holder; and
the two-piece inner peripheral block comprises a boundary between the two pieces that is adapted to allow passage of gas from between the first and second molds.

13. The mold structure for molding a lamp inserting holder integrated type base board according to claim 12, wherein
the removable insert dies are supported within the second mold by removable guide bars extending from the removable insert dies to an outer edge of the second mold,
and the interface between the guide bars and the second mold is adapted to allow the passage of the gas from the boundary between the two pieces of the two-piece inner peripheral block.

14. The mold structure for molding a lamp inserting holder integrated type base board according to claim 6, wherein the removable insert dies are supported within the second mold by removable guide bars extending from the removable insert dies to an outer edge of the second mold.

15. The mold structure according to claim 6, further comprising, for each cavity, a guide bar having a first end fixed to the second mold by a bolt, and a second end supporting the removable insert dies.

16. The mold structure for molding a lamp inserting holder integrated type base board according to claim 6, wherein the removable insert dies are unmovably supported by the second mold.

17. A mold structure for molding a lamp inserting holder integrated type base board comprising:
a first mold for molding a rear face side of a main body of the base board; and
a second mold opposed to the first mold for molding a front face side of the main body of the base board, the second mold including a holder molding cavity, the holder molding cavity at least partially defined by one or more removable insert dies,
wherein the removable insert dies in the holder molding cavity are supported, on a side opposite the base board, by the second mold, and
wherein the insert dies comprise an outer peripheral block for molding an outer side of a lamp inserting holder and an inner peripheral block arranged to be inserted to an inner side of the outer peripheral block for molding an inner side of the lamp inserting holder including a lamp inserting hole,
wherein the holder molding cavity is formed as a concave portion in a surface of the second mold, and
wherein the insert dies in the holder molding cavity are in contact with each other and are supported by an end surface of a single guide bar fixed to the second mold.

18. The mold structure for molding a lamp inserting holder integrated type base board according to claim 17, wherein the removable insert dies are unmovably supported by the second mold.

* * * * *